(12) United States Patent
Zhuromskyy et al.

(10) Patent No.: US 10,698,291 B2
(45) Date of Patent: Jun. 30, 2020

(54) INTEGRATED PHASED ARRAY FOR TWO DIMENSIONAL BEEM STEERING THROUGH CONSTRUCTIVE INTERFERENCE BY LIGHT EMITTING STRUCTURES COMPRISING SELECT ELEMENTS ON A TWO-DIMENSIONAL LATTICE

(71) Applicant: Quanergy Systems, Inc., Sunnyvale, CA (US)

(72) Inventors: Oleksandr Zhuromskyy, Sunnyvale, CA (US); Louay Eldada, Sunnyvale, CA (US)

(73) Assignee: Quanergy Systems, Inc., Sunnyvale, CA (US)

(*) Notice: Subject to any disclaimer, the term of this patent is extended or adjusted under 35 U.S.C. 154(b) by 0 days.

(21) Appl. No.: 15/986,574

(22) Filed: May 22, 2018

(65) Prior Publication Data

US 2019/0361319 A1 Nov. 28, 2019

(51) Int. Cl.
| | |
|---|---|
| *G02F 1/29* | (2006.01) |
| *G01S 17/89* | (2020.01) |
| *G02F 1/295* | (2006.01) |
| *H01S 3/00* | (2006.01) |
| *G01S 17/04* | (2020.01) |

(52) U.S. Cl.
CPC ............ *G02F 1/2955* (2013.01); *G01S 17/04* (2020.01); *G01S 17/89* (2013.01); *H01S 3/0071* (2013.01); *H01S 3/0085* (2013.01)

(58) Field of Classification Search
CPC ...... G02F 1/2955; G01S 17/026; G01S 17/89; H01S 3/0071; H01S 3/0085
See application file for complete search history.

(56) References Cited

U.S. PATENT DOCUMENTS

| | | | | |
|---|---|---|---|---|
| 5,233,673 A | * | 8/1993 | Vali | G01S 7/48 385/14 |
| 6,188,819 B1 | * | 2/2001 | Kosaka | B82Y 20/00 385/115 |
| 6,798,938 B1 | * | 9/2004 | Cao | G02B 6/29302 385/11 |
| 7,689,068 B1 | * | 3/2010 | Wang | B82Y 20/00 385/129 |
| 8,200,055 B2 | * | 6/2012 | Subbaraman | B82Y 20/00 385/10 |
| 9,575,341 B2 | * | 2/2017 | Heck | G02F 1/1326 |
| 2005/0175345 A1 | * | 8/2005 | Shimada | G02B 6/29361 398/79 |
| 2011/0235181 A1 | * | 9/2011 | Hayashibe | G02B 1/118 359/577 |
| 2014/0376001 A1 | * | 12/2014 | Swanson | G01N 21/17 356/479 |
| 2016/0049765 A1 | * | 2/2016 | Eldada | G01S 17/10 356/5.01 |

(Continued)

*Primary Examiner* — Akm E Ullah
(74) *Attorney, Agent, or Firm* — Cooley LLP

(57) ABSTRACT

An apparatus has N optical structures positioned on a two-dimensional lattice defining a plane. The N optical structures are configured to redirect light out of the plane. The N optical structures are collectively arranged in a configuration that includes select elements on the two-dimensional lattice. N optical waveguides are integrated in the plane to individually supply optical power to each of the N optical structures.

15 Claims, 6 Drawing Sheets

(56) References Cited

U.S. PATENT DOCUMENTS

2016/0245895 A1* 8/2016 Lane ................... G01S 3/7867
2016/0261093 A1* 9/2016 Noda ..................... H01S 5/18
2017/0299700 A1* 10/2017 Pacala ................. G01S 17/42

* cited by examiner

INTEGRATED PHASED ARRAY FOR TWO DIMENSIONAL BEEM STEERING THROUGH CONSTRUCTIVE INTERFERENCE BY LIGHT EMITTING STRUCTURES COMPRISING SELECT ELEMENTS ON A TWO-DIMENSIONAL LATTICE

FIELD OF THE INVENTION

This invention relates generally to optical phased array systems. More particularly, this invention relates to an integrated optical phased array with optical structures in a configuration that includes select elements on a two-dimensional lattice.

BACKGROUND OF THE INVENTION

FIG. 1 illustrates a prior art optical phased array 100 with a laser source 102 that delivers optical power to waveguides 104_1 through 104_N, which are connected to phase tuners 106_1 through 106_N. The optical output of the phase tuners 106_1 through 106_N is applied to corresponding optical emitters 108_1 through 108_N.

Optical phased array 100 implements beam shaping. By controlling the phase and/or amplitude of the emitters 108_1 through 108_N, the electro-magnetic field close to the emitters, known as the near field, can be controlled. Far away from the emitters 108_1 through 108_N, known as the far field, the electro-magnetic field can be modeled as a complex Fourier transform of the near field. To achieve a narrow beam in the far field, a flat phase profile in the near field is required. The width of the array determines the width of the far-field beam, scaling inversely. The slope of the near field phase profile determines the output angle of the beam. This means that by phase tuning the emitters, beam steering is achieved.

There is an ongoing need for improved optical phased array configurations, which is addressed with the embodiments disclosed herein.

SUMMARY OF THE INVENTION

An apparatus has N optical structures positioned on a two-dimensional lattice defining a plane. The N optical structures are configured to redirect light out of the plane. The N optical structures are collectively arranged in a configuration that includes select elements on the two-dimensional lattice. N optical waveguides are integrated in the plane to individually supply optical power to each of the N optical structures.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 2:
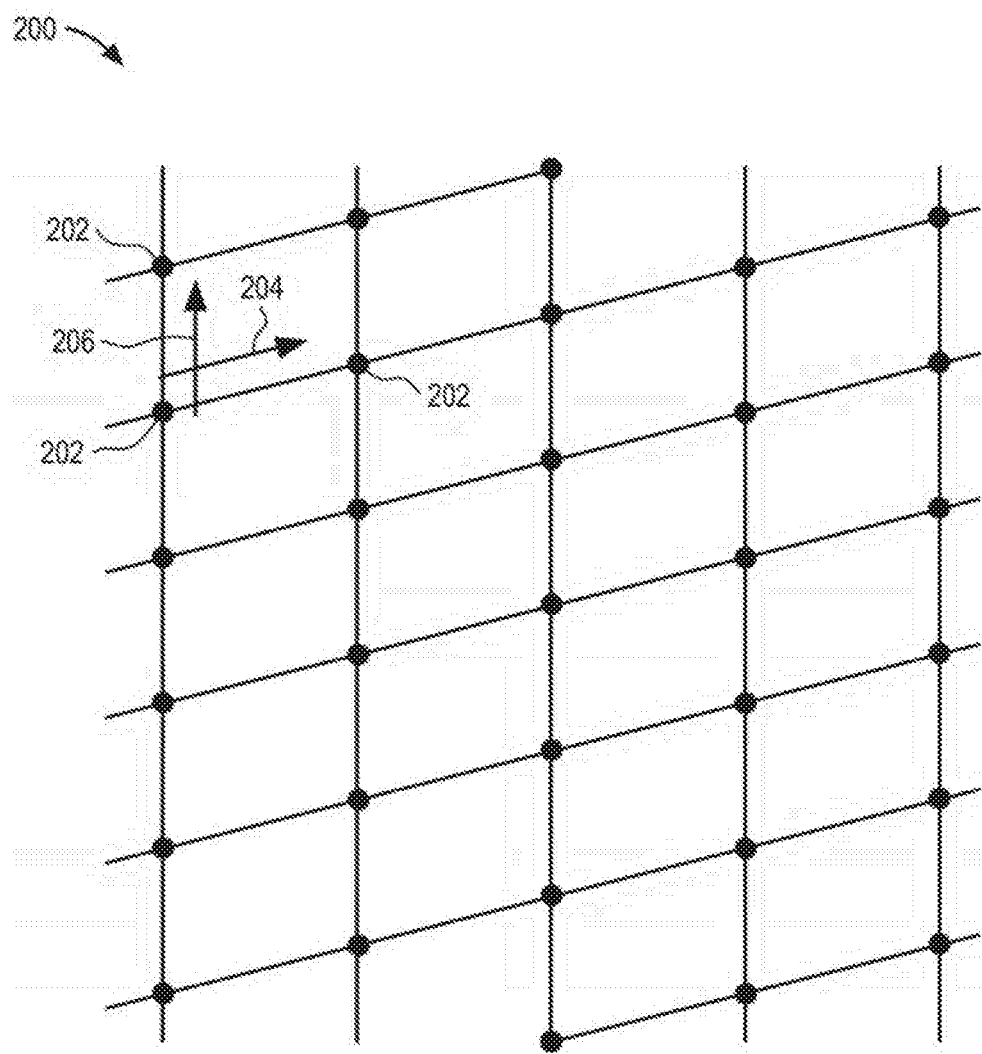
FIG. 2 illustrates a two-dimensional lattice utilized in accordance with an embodiment of the invention.

FIG. 2 illustrates a two-dimensional lattice 200 formed by nodes 202 distributed on a plane in a periodic manner. The lattice 200 has two primary vectors 204 and 206, which may or may not be parallel and may have identical or different lengths.

Figure 3:
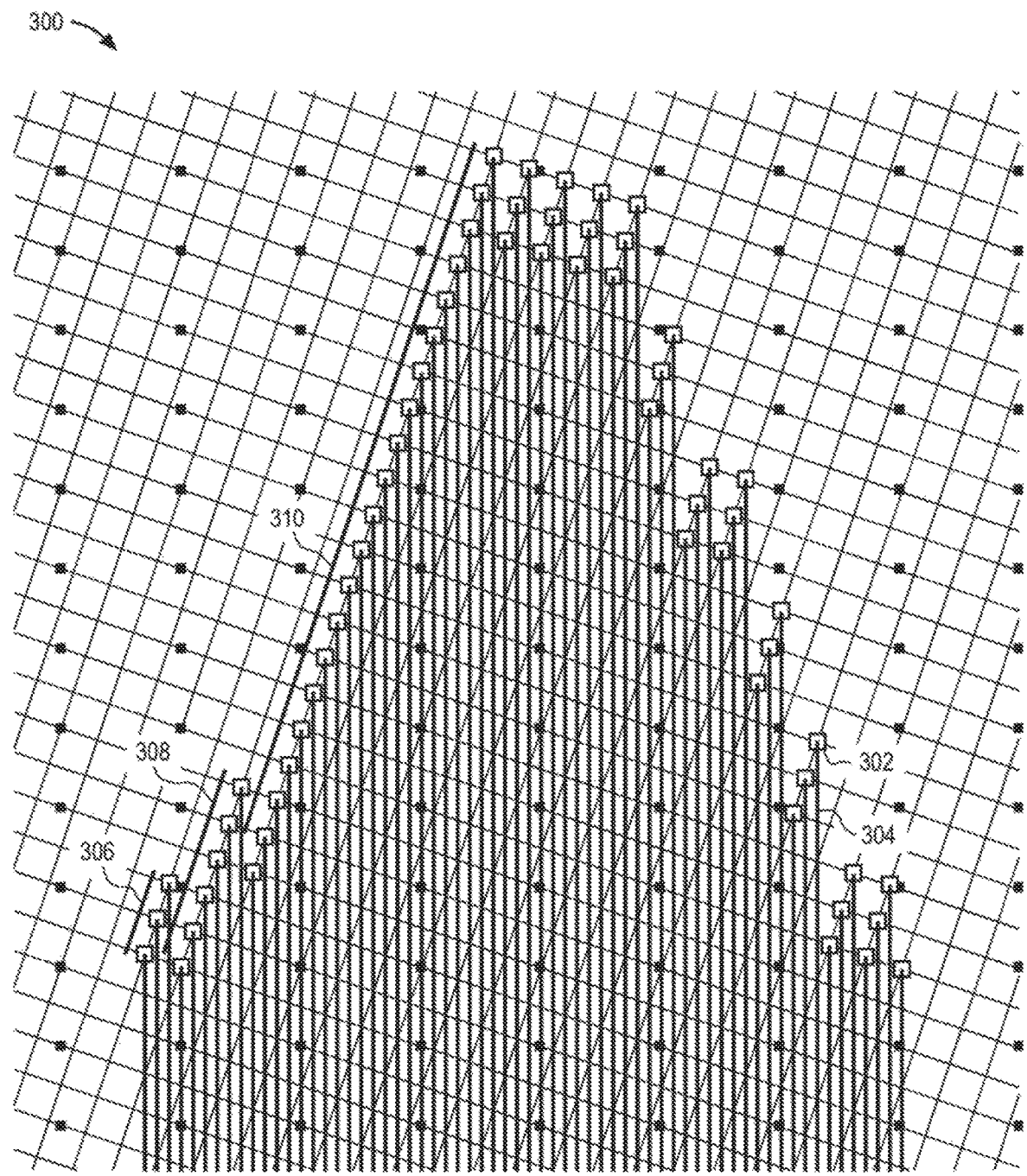
FIG. 3 illustrates a first arrangement of optical structures with corresponding optical waveguides in a two-dimensional lattice in accordance with an embodiment of the invention.
Figure 4:
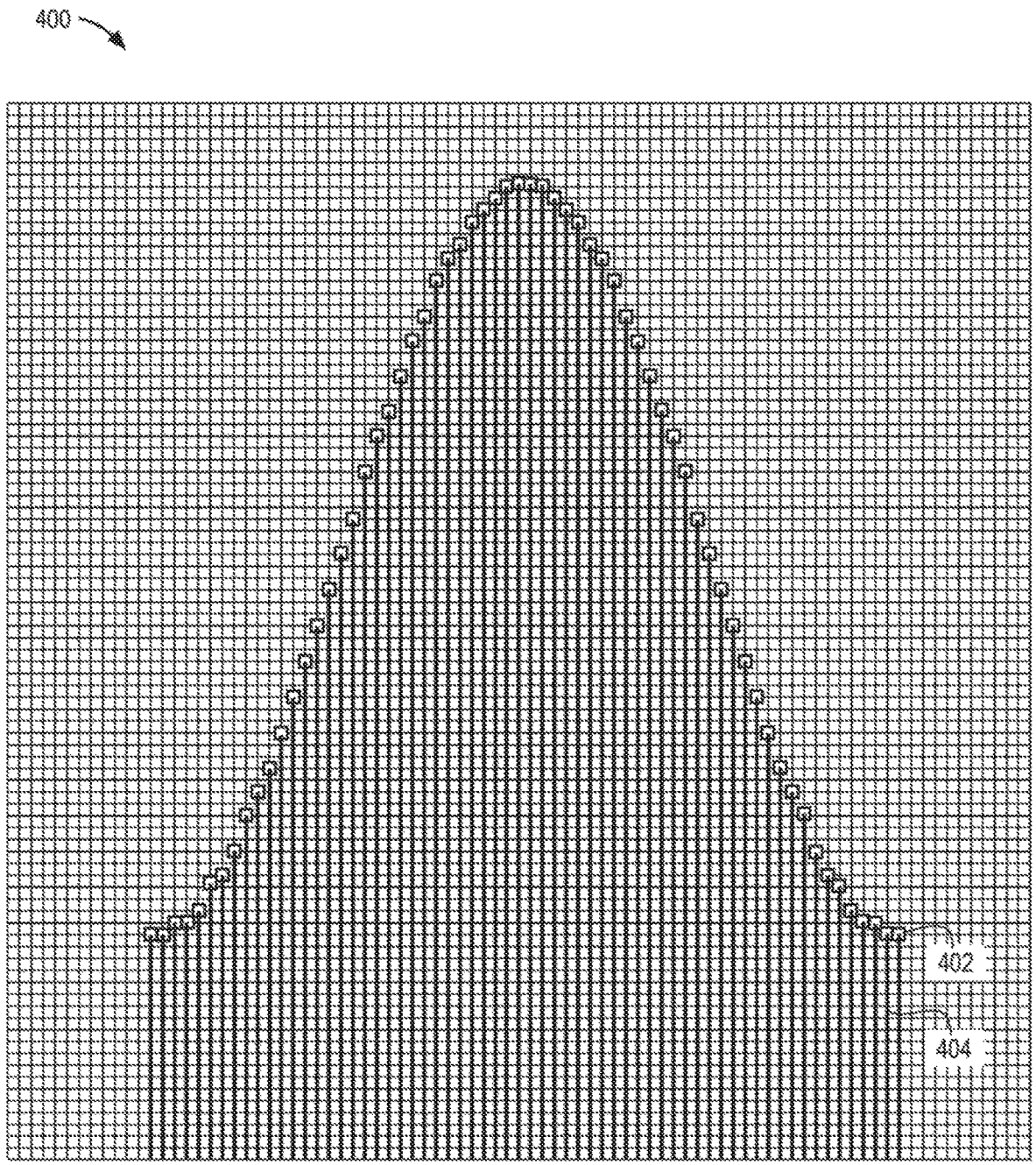
FIG. 4 illustrates a second arrangement of optical structures with corresponding optical waveguides in a two-dimensional lattice in accordance with an embodiment of the invention.

The square lattices of FIGS. 3 and 4 with orthogonal and equal primary vectors are exemplary; any other two-dimensional lattice may be used in accordance with embodiments of the invention, such as a hexagonal lattice with non-orthogonal axes.

FIG. 3 illustrates a two-dimensional square lattice 300. Optical structures 302 are positioned in a curved configuration (an imaginary line connecting all of the optical structures has a curved configuration). The optical structures 302 may be mirrors, gratings, fiber end facets, waveguides terminated by mirrors, laser diodes or light scattering particles. Each optical structure 302 has a corresponding optical waveguide 304.

In its most general form, a curved configuration is an aggregate collection of optical structures that has curved components; the curved configuration may include linear segments, but the aggregate collection of optical structures has curved components. The curved configuration of FIG. 3 has slanted liner segments, such as segments 306, 308 and 310.

More generally, the optical structures 302 are arranged in a configuration that includes select elements on the two dimensional lattice. That is, select optical structures are positioned on the two dimensional lattice. The select elements may be in an irregular configuration, as shown in FIG. 3.

FIG. 4 illustrates a two-dimensional lattice 400 with orthogonal axes that form a regular square lattice. Optical structures 402 are positioned in a curved configuration. Each optical structure 402 has a corresponding optical waveguide 404. The curved configuration in FIG. 4 approximates a sinusoidal function. Embodiments of the invention utilize curved configurations of emitters in the form of parabolas and circles. The configuration of optical structures may form a digitized line.

The disclosed devices, such as shown in FIGS. 3 and 4 may be arranged in a stack such that the optical structures in the different layers constitute a single optical phase array. This allows for more emitters, larger array dimensions, and smaller lattice constants.

In one embodiment, the horizontal width of N optical waveguides is N−1 times waveguide pitch, where pitch is the distance between adjacent waveguides. In one embodiment, each of the N optical waveguides has a substantially identical waveguide pitch corresponding to a lattice constant.

The optical structures are placed in the nodes of a two-dimensional lattice defining a plane to produce regular beam patterns. Optical structures placed in non-node positions of the two-dimensional lattice produce a single beam.

Optical structures occupy a narrow elongated region such that it can be powered by a waveguide array in one plane. The narrowness of the region allows one to keep the emitter-to-emitter distance small, which provides for large beam to beam angular separation. The elongated region occupied by the emitters should enclose an area of sufficient lateral dimension to ensure the required beam confinement.

The disclosed techniques may be used in connection with reconfigurable emitting antenna for scanning systems (i.e., Lidar), information display, information writing, precision temperature control, high security communication systems relying on spatially confined transmission or a laser gun.

The proposed structure provides a possibility to form and steer a beam of electromagnetic radiation. The beam formation is achieved by individually controlling the phases of the radiation from the optical structure (e.g., emitters) constituting the array such, that they interfere constructively in a particular direction. For any other direction a new set of emitter phases should be determined (experimentally or theoretically). The steering is achieved by switching the emitter phases to the predefined values so that the beam is formed in the corresponding directions. The steering can be achieved only in the angular range illuminated by the individual emitters. In a most general sense, individual emitters are simply optical structures. As used herein, an optical structure is a mirror, grating, fiber end facet, waveguide terminated by a mirror, laser diode or light scattering particles.

Regular arrays—the ones having crystal like lattices—produce a set of beams, as the constructive interference condition is satisfied for multiple directions simultaneously. The angular separation of the beams—the smallest beam to beam angle—is inversely proportional to the array's lattice constant. The beam contrast—the relation of the energy density in the beam relative to the background energy density—is proportional to the array size (number of emitters constituting the array). The beam's angular size—the beam's full width at half maximum (FWHM)—is inversely proportional to the lateral dimensions of the array.

Phases of the visible and IR electromagnetic radiation can be controlled by thermo- or electro-optical phase shifters. The phases of the electromagnetic waves radiated by each emitter should be controlled individually. The waveguides should not interfere with each other, which is usually achieved by providing enough waveguide to waveguide separation. Emitter arrays can be supplied with energy by means of integrated optical waveguides. The requirement for the minimum waveguide to waveguide spacing results in large emitter-to-emitter separation, as shown in FIGS. 3 and 4, which leads to small beam to beam angular distance.

The disclosed curved array structures facilitate a reduction in the lattice constant of the emitter array for the same waveguide pitch. The lateral dimensions of the array can be made several times larger than the lateral dimensions of a compact array of the same size and lattice constant. The small lattice constant in combination with laterally extending lattice provide for well confined beams with large beam-to-beam separation. The large beam-to-beam separation is needed for the use in lidar systems to ensure that close beams are detected separately. The beam confinement translates into the system resolution—the smaller the beam—the finer is the resolution.

Those skilled in the art will appreciate that the relatively small lattice constant and larger array dimensions facilitates a larger beam-to-beam angle compared to a compact array of emitters with the same number of emitters.

Figure 5:
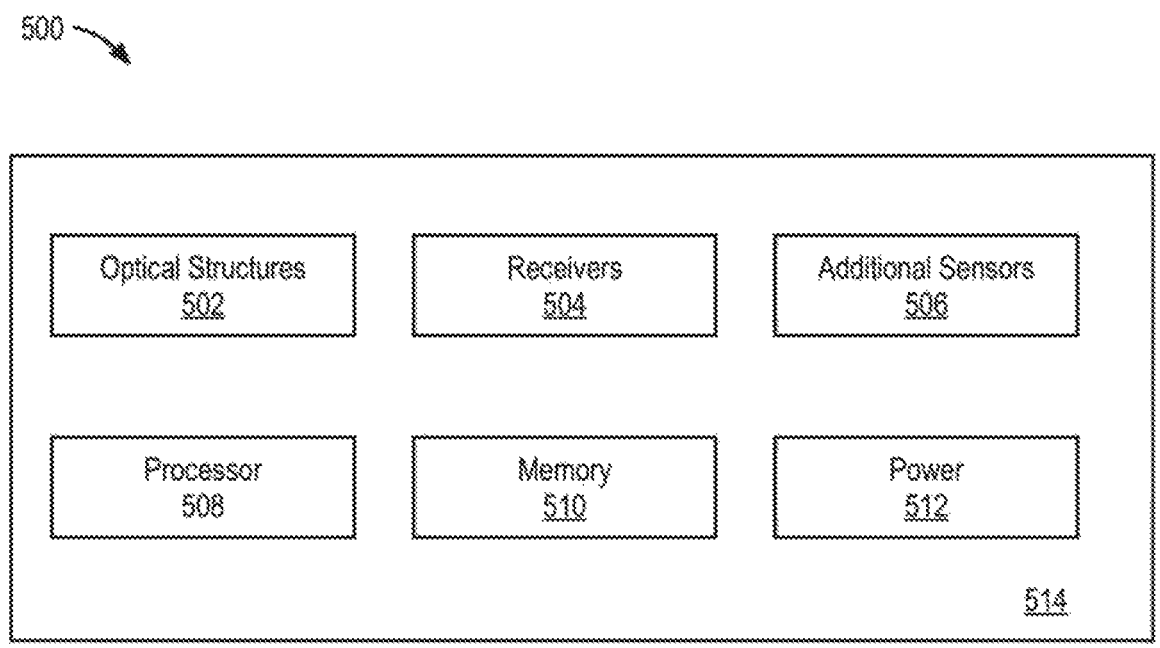
FIG. 5 illustrates system components utilized in conjunction with the optical phased array.

Any system incorporating the disclosed emitters also operates with any number of complementary sensors, data processing modules, communication modules, storage modules and power supply. Mechanical components are configured to protect, connect and mount the system components. For example, FIG. 5 illustrates a system 500 with the disclosed optical structures 502, receivers 504, additional sensors 506, a processor 508, memory 510, and power electronics 512 mounted on a printed circuit board 514.

The invention can be used in connection with Time of Flight (ToF) lidar sensors for real-time three-dimensional mapping and object detection, tracking, identification and/or classification. A lidar sensor is a light detection and ranging sensor. It is an optical remote sensing module that can measure the distance to a target or objects in a scene by irradiating the target or scene with light, using pulses (or alternatively a modulated signal) from a laser, and measuring the time it takes photons to travel to the target or landscape and return after reflection to a receiver in the lidar module. The reflected pulses (or modulated signals) are detected with the time of flight and the intensity of the pulses (or modulated signals) being measures of the distance and the reflectivity of the sensed object, respectively. Thus, the two dimensional configuration of optical emitters provides two degrees of information (e.g., x-axis and y-axis), while the time of flight data provides a third degree of information (e.g., z-axis or depth).

Microfabrication and/or nanofabrication techniques are used for the production of an optical phased array photonic integrated circuit (OPA PIC) that includes optical power splitters that distribute an optical signal from a laser, optical-fiber coupled to the chip or integrated on the chip, tunable optical delay lines for phase control and integrated optical amplifiers to increase optical power. The delay lines direct their output optical signals to structures, such as optical emitters, mirrors, gratings, laser diodes, light scattering particles and the like. The structures establish out-of-plane coupling of light.

Figure 1:
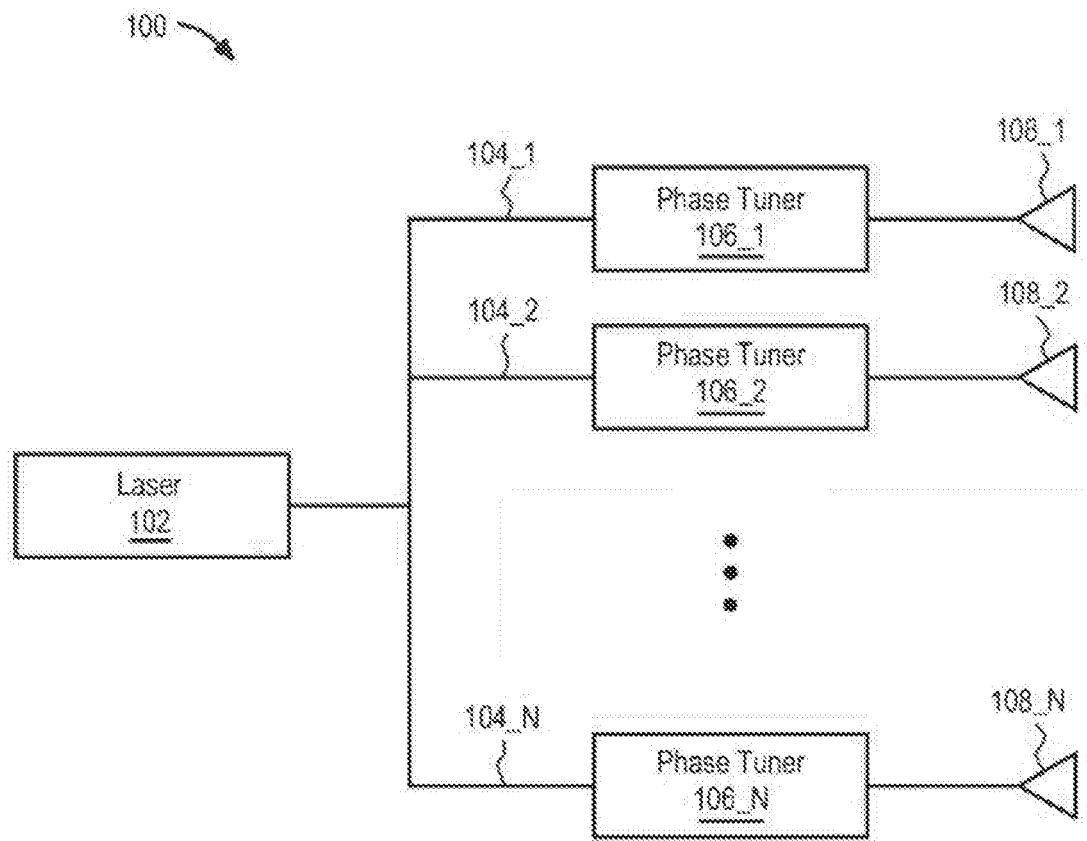
FIG. 1 illustrates an optical phased array configured in accordance with the prior art.

The phase tuners (such as phase tuners 106 of FIG. 1) establish phase delays to form a desired far field radiation pattern through the interference of emitted beams. Phase shifting may be implemented with any number of configurations of phase shifting optical devices, including, but not limited to: gain elements, all-pass filters, Bragg gratings, dispersive materials, wavelength tuning and phase tuning. When phase tuning is used, the actuation mechanisms used to tune delay lines, and optical splitters when they are tunable, can be any of a variety of mechanisms, including but not limited to: thermo-optic actuation, electro-optic actuation, electro-absorption actuation, free carrier absorption actuation, magneto-optic actuation, liquid crystal actuation and all-optical actuation.

In one embodiment, the vertical dimension (i.e., the dimension perpendicular to the steering direction) of the spot size is reduced with at least one on-chip grating or at least one off-chip lens. Types of off-chip lens include but are not limited to: refractive lens, graded-index lens, a diffractive optical element and a holographic optical element.

In a time of flight lidar application, the OPA-based lidar includes an optical transmitter (including laser, laser driver, laser controller, OPA PIC, and OPA controller), an optical receiver (including photodetector(s), photodetector drivers, and receiver electronics), and electronics for power regulation, control, data conversion, and processing.

Figure 6:
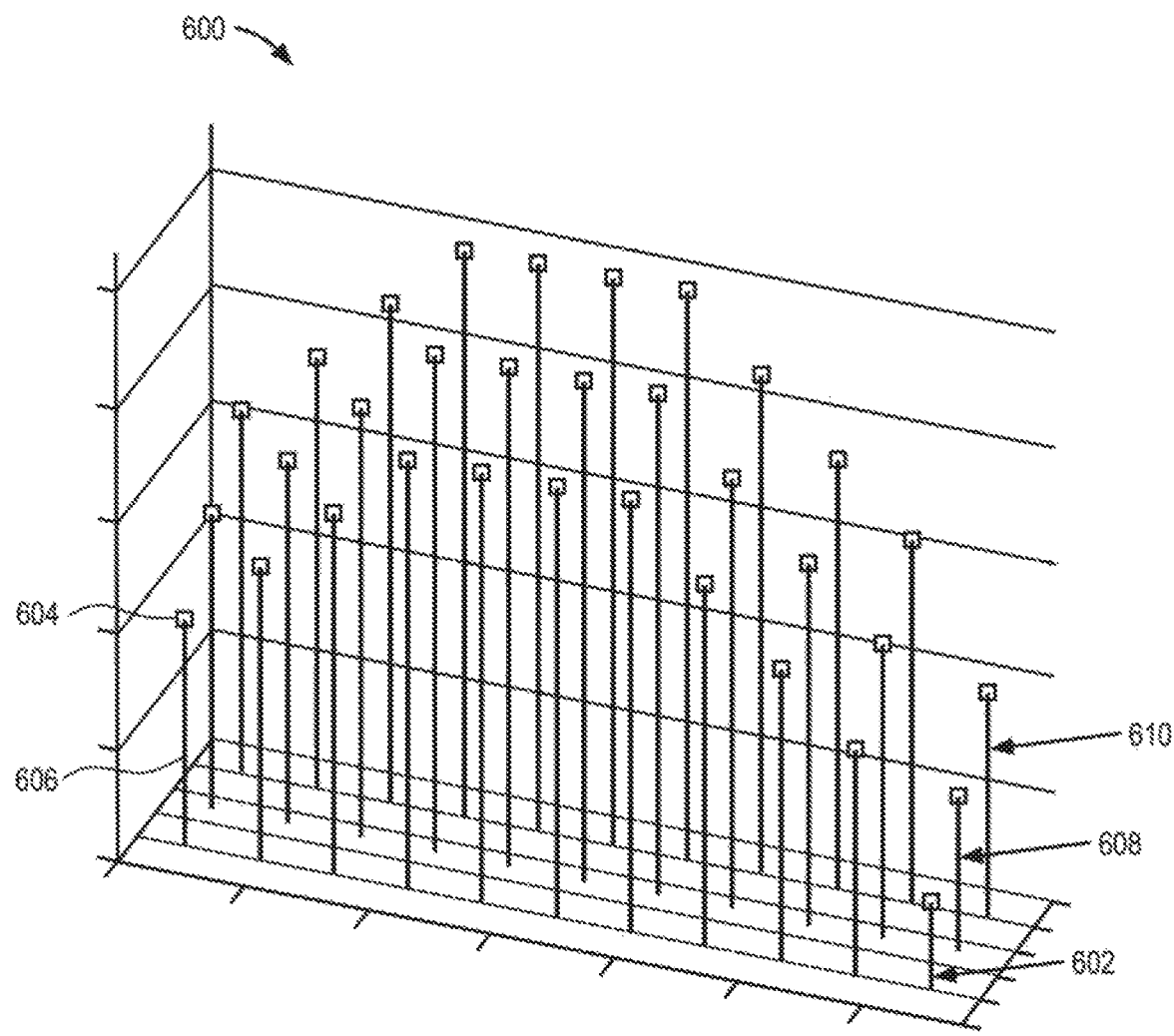
FIG. 6 illustrates a parallel plane embodiment of the invention.

FIG. 6 illustrates an embodiment of the invention in which the disclosed devices, such as shown in FIGS. 3 and 4, are stacked in M parallel planes. The parallel plane embodiment 600 includes a first two-dimensional lattice in a first plane 602. The first two-dimensional lattice includes optical structures 604 and corresponding optical waveguides 606. The structure 600 also includes a second two-dimensional lattice in a second plane 608 and a third two-dimensional lattice in a third plane 610. Observe that each parallel plane is staggered so that out of plane light from one plane is not obstructed by another plane. The optical structures and optical waveguides in each plane are accompanied by complementary electronics, such as shown in FIG. 5.

The following are exemplary implementations of the disclosed technology.

Example 1 (Beam Forming)

An optical chip was produced on a silicon platform comprising a laser interface, energy splitting facility, phase shifter array, and the OPA structure of FIG. 4. Chirped grating was used to redirect light out of the chip plane. A laser was integrated onto the chip, and the chip was mounted onto a control board providing the power for the laser and the possibility to individually change the phase of light emitted by each grating in the OPA. A beam was formed by applying particular phase shifts to each of the OPA channels. The beam was observed as a bright spot on a screen. The particular phase shifts were obtained in a procedure where the optical power through a small aperture was maximized in an iterative optimization procedure. The shape of the beam (the bright spot on the screen) corresponded to the theoretically predicted shape.

Example 2 (Beam Scanning)

The immobilized device of Example 1 can form beams in different directions. For each direction the corresponding set of OPA phases can be obtained by placing the aperture on the line pointing from the OPA into this direction and performing the iterative optimization procedure. Later, switching between the states is achieved by applying the OPA phase sets corresponding to the desired directions. As the states switch, one can see that the position of the beam on the screen changes.

Example 3 (2D Beam Steering)

The OPA of Example 1 is immobilized, a screen is fixed such that the direction of the strongest grating outcoupling is normal to the screen. A set of 16 points were selected such that they were uniformly distributed along a circle on the screen centered in the point of the strongest grating outcoupling. For each of the 16 points, the corresponding set of OPA phases was determined to form a beam at the position of the point. One can observe the formed beam travelling along the circular line as the OPA switches the 16 states on by one.

Example 4 (LIDAR)

The device of Example 1 is connected with a detector device capable of recording light emitted by the laser on the OPA chip. The laser radiation is emitted in pulses by the laser, a set of OPA phases forms a beam, which is then scattered by a target (white screen). It was observed that the fly time of light from the OPA emitter array to the target and to the detector are different depending on the position of the target. Thus, the emitter module comprised of the OPA chip can be used in the LIDAR system to determine the range to the target.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
N optical structures positioned on a two-dimensional lattice defining a plane, the N optical structures configured to redirect light out of the plane, the N optical structures collectively arranged in a configuration that is curved and that includes select elements on the two-dimensional lattice;
N optical waveguides integrated in the plane to individually supply optical power to each of the N optical structures;
N optical phase shifters integrated into the N optical waveguides to individually control the phases of light emitted by the N optical structures to provide two dimensional beam confinement and two dimensional beam steering through constructive interference;
a second set of N optical structures positioned on a second two-dimensional lattice defining a second plane stacked on top of the plane, the second set of N optical structures configured to redirect light out of the second plane, the second set of N optical structures collectively arranged in a configuration that includes select elements on the second two-dimensional lattice defining the second plane; and
a second set of N optical waveguides integrated in the second plane to individually supply optical power to each of the second set of N optical structures.

2. The apparatus of claim 1 wherein each of the N optical structures is positioned at an intersection of axes of the two-dimensional lattice.

3. The apparatus of claim 2 wherein the configuration has slanted linear segments.

4. The apparatus of claim 2 wherein the configuration approximates a sinusoidal function.

5. The apparatus of claim 2 wherein the configuration is a parabola.

6. The apparatus of claim 2 wherein the configuration is a circle.

7. The apparatus of claim 1 wherein the two-dimensional lattice has orthogonal axes.

8. The apparatus of claim 1 wherein the two-dimensional lattice has non-orthogonal axes.

9. The apparatus of claim 1 wherein the two-dimensional lattice has identical primary vectors defining a single lattice constant.

10. The apparatus of claim 1 wherein the two-dimensional lattice has primary vectors of different sizes defining two different lattice constants.

11. The apparatus of claim 1 wherein the horizontal width of the N optical waveguides is N−1 times waveguide pitch.

12. The apparatus of claim 1 wherein each of the N optical waveguides has a substantially identical waveguide pitch corresponding to a lattice constant.

13. The apparatus of claim 1 wherein the N optical structures are selected from mirrors, gratings, fiber end facets, waveguides terminated by mirrors, laser diodes and light scattering particles.

14. The apparatus of claim 1 in combination with a lidar system.

15. The apparatus of claim 1 implemented on M parallel planes.

* * * * *